(12) United States Patent
Settembre et al.

(10) Patent No.: US 8,503,296 B2
(45) Date of Patent: Aug. 6, 2013

(54) OPTIMIZED CONNECTION ADMISSION CONTROL FOR SYSTEMS USING ADAPTIVE MODULATION AND CODING TECHNIQUES

(75) Inventors: Marina Settembre, Rome (IT); Patrizia Testa, Valmontone (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 315 days.

(21) Appl. No.: 13/061,352

(22) PCT Filed: Aug. 29, 2008

(86) PCT No.: PCT/EP2008/061424
§ 371 (c)(1),
(2), (4) Date: Apr. 4, 2011

(87) PCT Pub. No.: WO2010/022791
PCT Pub. Date: Mar. 4, 2010

(65) Prior Publication Data
US 2011/0176415 A1  Jul. 21, 2011

(51) Int. Cl.
G06F 11/00 (2006.01)
H04J 1/16 (2006.01)
H04L 1/00 (2006.01)
H04L 12/26 (2006.01)

(52) U.S. Cl.
USPC .......................... 370/230; 370/230.1; 370/235

(58) Field of Classification Search
USPC .............. 370/230, 230.1, 231, 232, 233, 234, 370/235, 329, 330
See application file for complete search history.

(56) References Cited

U.S. PATENT DOCUMENTS

| | | | |
|---|---|---|---|
| 5,983,101 A | 11/1999 | Billstrom | |
| 7,023,798 B2 | 4/2006 | Bourlas et al. | |
| 7,813,282 B2 * | 10/2010 | Kim et al. | 370/234 |
| 8,270,353 B2 * | 9/2012 | Kim et al. | 370/329 |
| 2004/0085959 A1 | 5/2004 | Ohkawa | |
| 2004/0176098 A1 | 9/2004 | Besset-Bathias et al. | |
| 2006/0187942 A1 | 8/2006 | Mizutani et al. | |
| 2007/0223427 A1 | 9/2007 | Nakatsugawa | |
| 2008/0080378 A1 * | 4/2008 | Kim et al. | 370/234 |
| 2009/0059857 A1 * | 3/2009 | Kim et al. | 370/329 |
| 2009/0290553 A1 | 11/2009 | Matsukura et al. | |

FOREIGN PATENT DOCUMENTS

| | | |
|---|---|---|
| EP | 1 912 464 A2 | 4/2008 |
| JP | 2004-356855 A | 12/2004 |

* cited by examiner

Primary Examiner — Chuong T Ho

(57) ABSTRACT

A method and a connection admission control module are described herein for controlling the admission of a connection in a wireless communication system between a base station and a subscriber unit, in which a modulation and coding scheme of uplink and downlink communications can be varied over time. In addition, a base station is described herein that incorporates the connection admission control module.

22 Claims, 4 Drawing Sheets

OPTIMIZED CONNECTION ADMISSION CONTROL FOR SYSTEMS USING ADAPTIVE MODULATION AND CODING TECHNIQUES

TECHNICAL FIELD

The present invention relates to communication systems, in particular to wireless systems adopting adaptive modulation and coding.

BACKGROUND

Wireless networks are evolving rapidly, requiring high capacity data and video services and growing bandwidth use per subscriber.

A generic wireless system includes one or more subscriber units (SUs) that communicate with a base station (BS) via an air interface. Transmission from the base station to the subscriber units are commonly referred to as "downlink" transmissions. Transmissions from the subscriber units to the base station are commonly referred to as "uplink" transmissions.

An objective of these wireless communication systems is to provide communication channels on demand between the subscriber units and their respective base stations in order to connect a subscriber unit end user with the fixed network infrastructure.

These systems are characterized by a layered architecture including a Media Access Control (MAC) layer and a physical layer. The MAC layer manages the access of a subscriber to the system, the inter-channel handoff, the power control, privacy of traffic data, the access to the shared radio resources and the frame transmission construction. The physical layer performs data coding, modulation, transmission and reception.

A major objective of the communication services is to provide communication with a satisfactory Quality of Service (QoS). QoS is a measure used to specify the parameters that characterize the service offered by the network, namely the degree of satisfaction of the users with the communication services provided by the system. The QoS measures commonly used include call blocking and dropping probability, packet loss probability, transmission delay and delay jitter, and bit error rate.

In general a wireless network will support a variety of services with different traffic characteristics and QoS requirements: in particular, some services, such as voice, are regarded as high-QoS services, or guaranteed traffic, while other services, such as Internet browsing, video streaming and video conferencing, require lower levels of QoS. Based on the type of service and of their required QoS, various availability levels can be defined in the system, with different degrees of continuity of the connection required by the services.

Another important goal that needs to be considered in wireless networks is resource utilization. Due to limited radio spectrum, a highly utilized system that can provide a satisfactory amount of QoS to the users is always a desired solution. However, high resource utilization and QoS provisioning are always conflicting goals. Resources are set-aside for active users, so that their QoS can be maintained, but unused resources mean low utilization. In order to have a balance in the two conflicting goals, the amount of reserved resources should be calculated carefully.

With respect to these goals, a central role is played by the Connection Admission Control (CAC) module, a module in the MAC layer which is responsible for determining if a connection can be allowed given the current channel conditions.

The MAC layer, at the base station side, sends connection requests, specifying their QoS requirements and their availability level, to the CAC module that, on the basis of this information and the available system bandwidth, determines if connections can be admitted or not in the system. When a connection is admitted, the CAC allocates to it in a static way the bandwidth, called admission-bandwidth, necessary to satisfy its QoS requirements and to preserve those of already admitted connections.

In recent years, in order to improve the efficient exploitation of resources, Adaptive Modulation and Coding (AMC) techniques have been developed. The basic idea behind AMC is that the modulation and coding scheme on the communication channels is not fixed statically, but can vary dynamically over time in response to the varying quality of the radio link. More specifically, AMC denotes the matching of the modulation, coding and other signal and protocol parameters to the conditions of the radio link, such as the pathloss, the interference due signals coming from other transmitters, the sensitivity of the receiver, the available transmitter power margin, and so on. The modulation and coding scheme is varied accordingly, and consequently the bit rate and robustness of data transmission. The process of AMC is a dynamic one and the signal and protocol parameters change as the radio link conditions change.

AMC is a function performed at the MAC layer and implemented at both the transmitter and the receiver. The AMC function chooses the link modulation and channel coding among a set of predefined AMC schemes with different spectrum efficiency and robustness according to the link conditions. Most commonly the link conditions are monitored by measuring the signal-to-noise ratio (SNR). Each AMC scheme is mapped to a given range of SNR that defines the thresholds for changing from one AMC scheme to another.

Adaptive modulation systems invariably require some channel information at the transmitter: in order to support adaptive modulation and coding, the base station, that commands the uplink and downlink AMC schemes' change, needs to periodically measure uplink conditions and receives information from the subscriber stations about downlink conditions. The base station, on the basis of such information, chooses the link modulation and channel coding among a set of predefined AMC schemes, each mapped to a given range of SNR values, and successively communicates to the subscriber stations their AMC schemes.

AMC systems exhibit the intrinsic characteristic of having bandwidth variable with channel conditions and consequently they require efficient connection admission control and traffic handling mechanisms in order to bring advantages. Whenever link conditions deteriorate, since the link payload decreases, the admission control of a system that adopts the AMC technology must guarantee that services with high availability requirements, such as voice, are not affected. Services requiring lower availability requirements can instead be transmitted without many guarantees under worse link conditions.

In light of the above a major technical issue in current AMC systems is to provide suitable CAC policies able to assure guaranteed traffic and at the same time optimize bandwidth utilization.

The solutions proposed in the technical literature for Connection Admission Control in AMC systems do not completely exploit AMC system potential: most of the adopted CAC strategies are a simple extension of CAC adopted in non adaptive systems.

The most common implementations of CAC support allocation of resources to services with high QoS in a static way: the system calculates if the bandwidth corresponding to the most robust AMC scheme is available, and in that case the connection is accepted, otherwise is rejected. In other words, the CAC performs its decision regardless of link conditions, not improving the number of connections with high QoS admitted in the system when AMC is adopted with respect to traditional systems. In case of good link conditions, the additional link capacity provided by more efficient AMC schemes is only exploited by low QoS traffic.

Solutions developed during recent years, aiming at increasing the admission rate of guaranteed traffic, are based on the connection suspension concept. For instance, in U.S. Pat. No. 7,023,798, connections are admitted in the system according to a pre-planned AMC scheme more efficient than the most robust one. When resource needs increase, some connections are suspended on the basis of precedence priority levels. This solution is rather conservative, since it does not react dynamically to the link conditions and therefore does not fully exploit the current bandwidth availability.

Other solutions, which apply to point to multipoint systems, for instance U.S. patent application Ser. No. 08/910,147 (now U.S. Pat. No. 5,983,101), exploit AMC schemes differentiation not only in terms of bandwidth efficiency, but also in terms of coverage range and interference immunity to estimate the optimal distribution of AMC schemes among terminals/connections in the cell. These solutions are rather complex to implement.

SUMMARY

The aim of the present invention is to provide a new Connection Admission Control that overcomes the above mentioned drawbacks This aim and other objects which will become better apparent hereinafter are solved by a method for controlling the admission of connections in a wireless communication system between a base station and a subscriber unit, in which the modulation and coding scheme of the uplink and downlink can be varied over time.

In the method, a request for a connection is received, the connection is admitted and the available bandwidth is updated, if the available bandwidth corresponding to the current AMC scheme is greater than the admission bandwidth of the connection.

Moreover, the method periodically evaluates if the current admission bandwidth can be changed for a plurality of active connections: if this is the case, and there is not enough bandwidth to allow the change, the method stops the admission of new connections, suspends at least one active connection and/or changes the AMC scheme of such active connection.

On the other hand, if the current admission bandwidth can be changed and there is enough bandwidth to allow the change, the method updates the current admission bandwidth for the plurality of active connections and updates the available bandwidth.

According to another aspect of the invention, a Connection Admission Control (CAC) module for controlling the admission of connections in a wireless communication system between a base station and a subscriber unit is provided, where the modulation and coding scheme of the uplink and downlink can be varied over time.

The module comprises means for receiving a request for a connection and means for admitting the connection and for updating the available bandwidth after checking that the available bandwidth corresponding to the current AMC scheme is greater than the admission bandwidth of the connection.

The module further comprises means for evaluating whether the current admission bandwidth can be changed for a plurality of active connections. Moreover, the module includes means for stopping the admission of new connections and means for suspending at least one active connection or for changing the AMC scheme of such active connection, after checking that the current admission bandwidth can be changed and there is not enough bandwidth to allow the change.

The module also comprises means for updating the current admission bandwidth for the plurality of active connections and for updating the available bandwidth, after checking that the current admission bandwidth can be changed and there is enough bandwidth to allow the change.

The aim and the objects of the invention are also achieved by a wireless communication station for a wireless communication system. The station comprises a Media Access Control (MAC) module and at least one physical layer device for handling wireless communication between the wireless communication station and a second wireless communication station.

The wireless communication station further comprises the above Connection Admission Control (CAC) module. The Media Access Control module comprises means for interfacing with the physical layer device and means for sending connection requests to the Connection Admission Control module.

When receiving a request for a connection the CAC module may receive either a request for a new connection or a request for a suspended connection.

Optionally, when evaluating current admission bandwidth for a plurality of active connections, the CAC module may evaluate current admission bandwidth for all active connections.

When evaluating if current admission bandwidth can be changed for a plurality of active connections, the module may perform the following steps: for each connection, the CAC module evaluates if the SNR value of the connection reaches the threshold corresponding to an AMC scheme change. If the SNR value of the connection does not reach the threshold corresponding to an AMC scheme change, the CAC module decides that the admission-bandwidth could not be changed.

On the other hand, if the SNR value of the connection reaches the threshold corresponding to an AMC scheme change, the CAC module evaluates if the AMC scheme change is a downwards change or an upwards change. If the AMC scheme change is a downwards change, the CAC module decides that the admission-bandwidth could be changed; if the AMC scheme change is an upwards change, the CAC module evaluates if the service unavailability time of the connection has reached its maximum value. If the service unavailability time has reached its maximum value, the CAC module decides that the admission-bandwidth cannot be changed, otherwise the module decides that the admission-bandwidth can be changed.

When the CAC module updates the admission bandwidth for a plurality of connections and/or suspends a plurality of connections, it may check if there is at least a connection whose maximum service unavailability time has not expired, and suspends it. Moreover, the module may check if there is at least one active connection that can experience an upwards AMC scheme change, having an admission bandwidth lower than the one previously granted: in this case the connection may experience an increase of its service unavailability time, so the CAC module changes the AMC scheme for the at least one connection.

The above CAC module and method are able to optimize bandwidth allocation yet maintaining the QoS levels requested by services. Moreover, the CAC is suitable to be easily implemented in an AMC system and fully exploits AMC capabilities.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
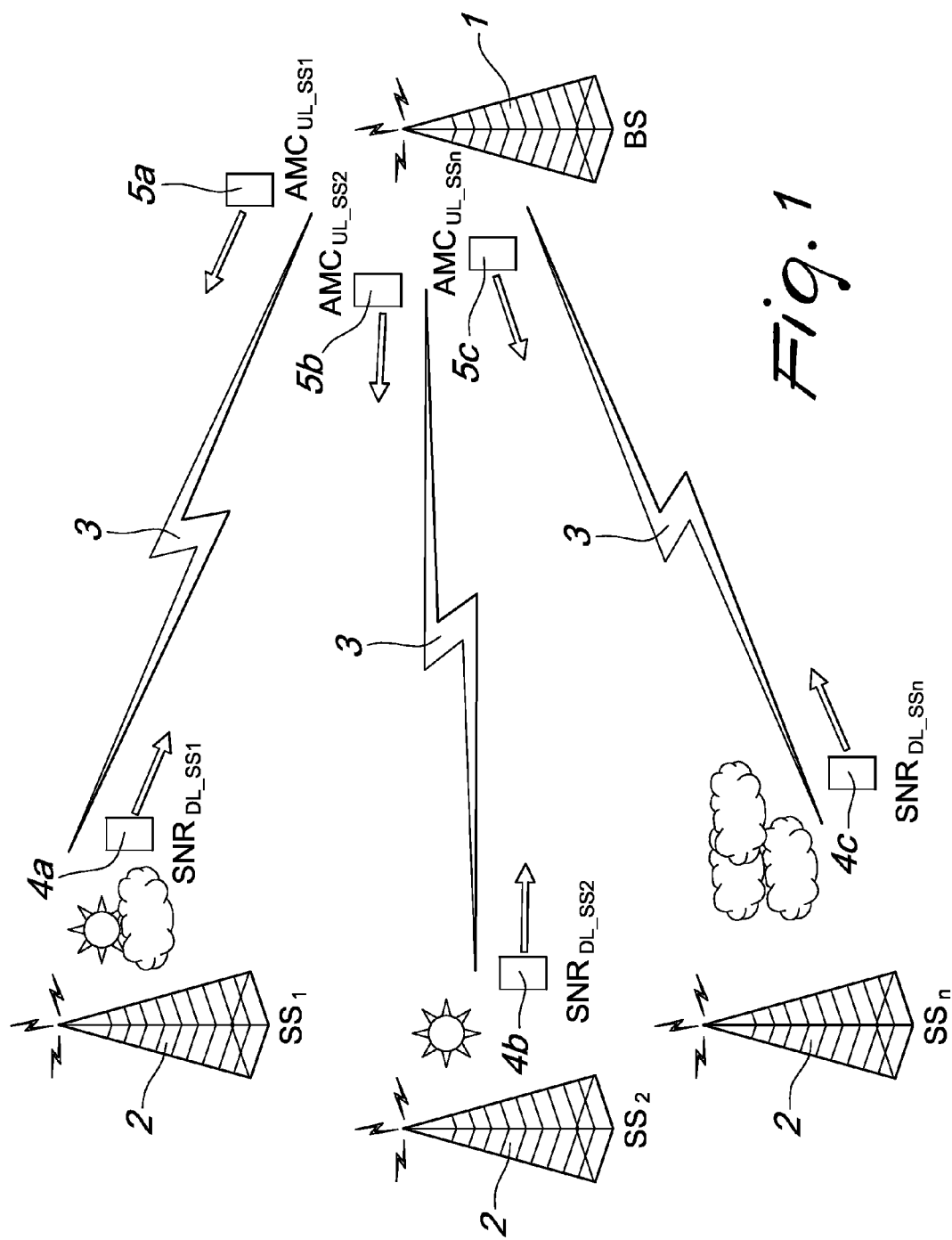
FIG. 1 is a schematic representation of a wireless system adopting adaptive modulation and coding.

A high level representation of a wireless system adopting adaptive modulation and coding according to the invention is represented in FIG. 1. The figure shows a base station 1, and a plurality of subscriber stations 2, connected to the base station via wireless links 3. The communications in these links can be upwards or downwards: in particular, in the AMC environment according to the invention subscriber stations 2 are configured to send to the base station 1 information packets 4a, 4b and 4c regarding the downlink conditions, while the base station 1 is adapted to measure the uplink conditions. Based on the downlink and uplink information, the base station 1 can determine the overall link conditions and choose the most appropriate modulation and channel coding scheme, which is then communicated to the subscriber stations 2 via conventional messages 5a, 5b and 5c.

Figure 2:
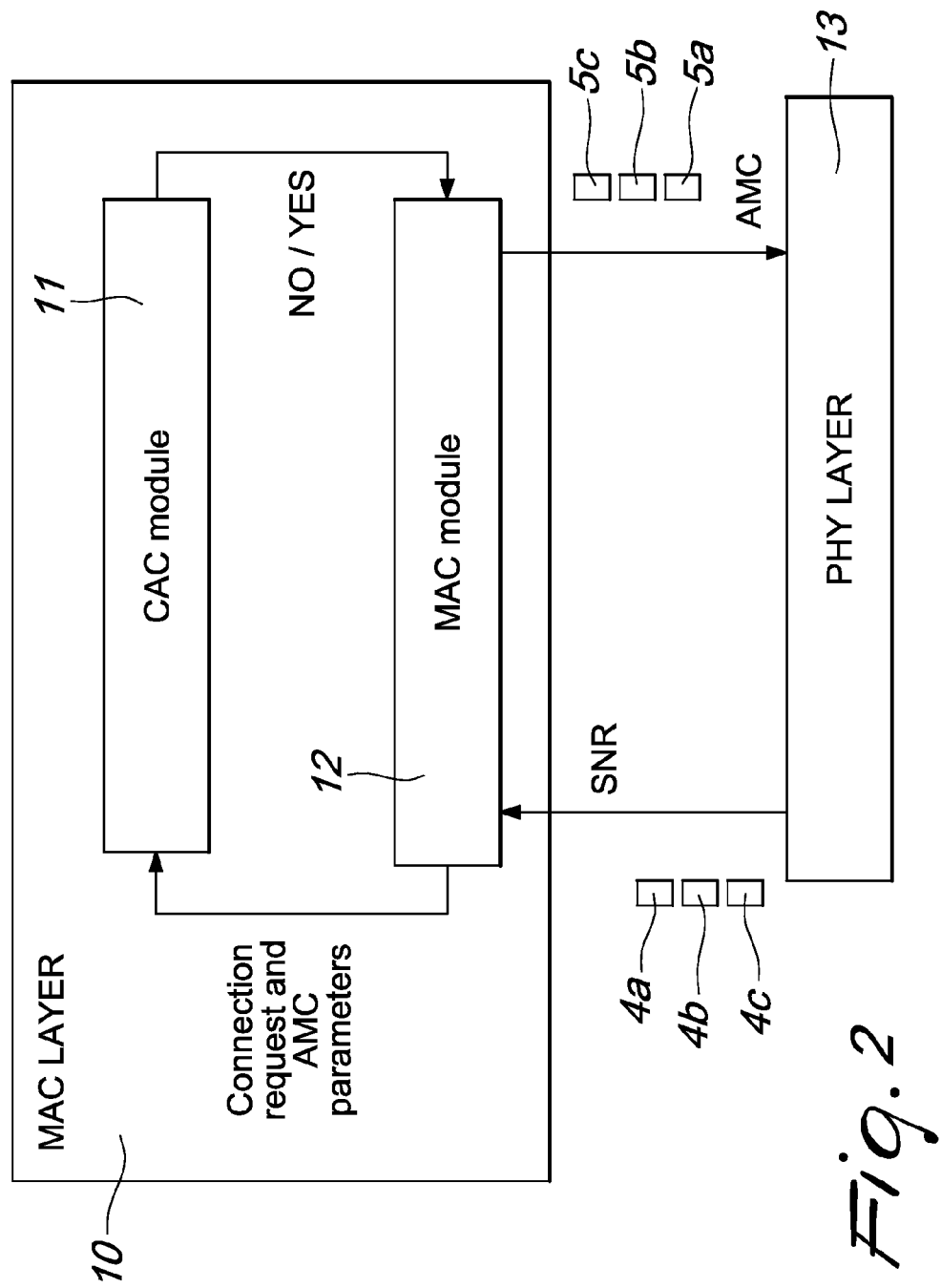
FIG. 2 is a block diagram showing the CAC module used in the invention at the base station side.

More in detail, with reference to FIG. 2, the MAC layer 10 at the base station side of the system of FIG. 1 comprises a CAC module 11 according to the invention and configured to determine if a connection can be allowed given the current channel conditions, and a MAC module 12, which has addressing function and interfaces to the physical layer 13 of the system.

The CAC module 11 may be configured to receive connection requests and AMC parameters from the MAC module 12 and to send corresponding responses (YES/NO) to the requests and the connection admission bandwidth to the MAC module 12. The CAC module 12 handles new and existing connections, updating the AMC scheme of existing connections and, if necessary, suspending them. Each connection is characterized by a given QoS, a given availability level, and a given unavailability time, that is the total time the connection has been suspended.

The functioning of the CAC module 11 according to present invention will now be described with reference to FIGS. 3 and 4.

Figure 3:
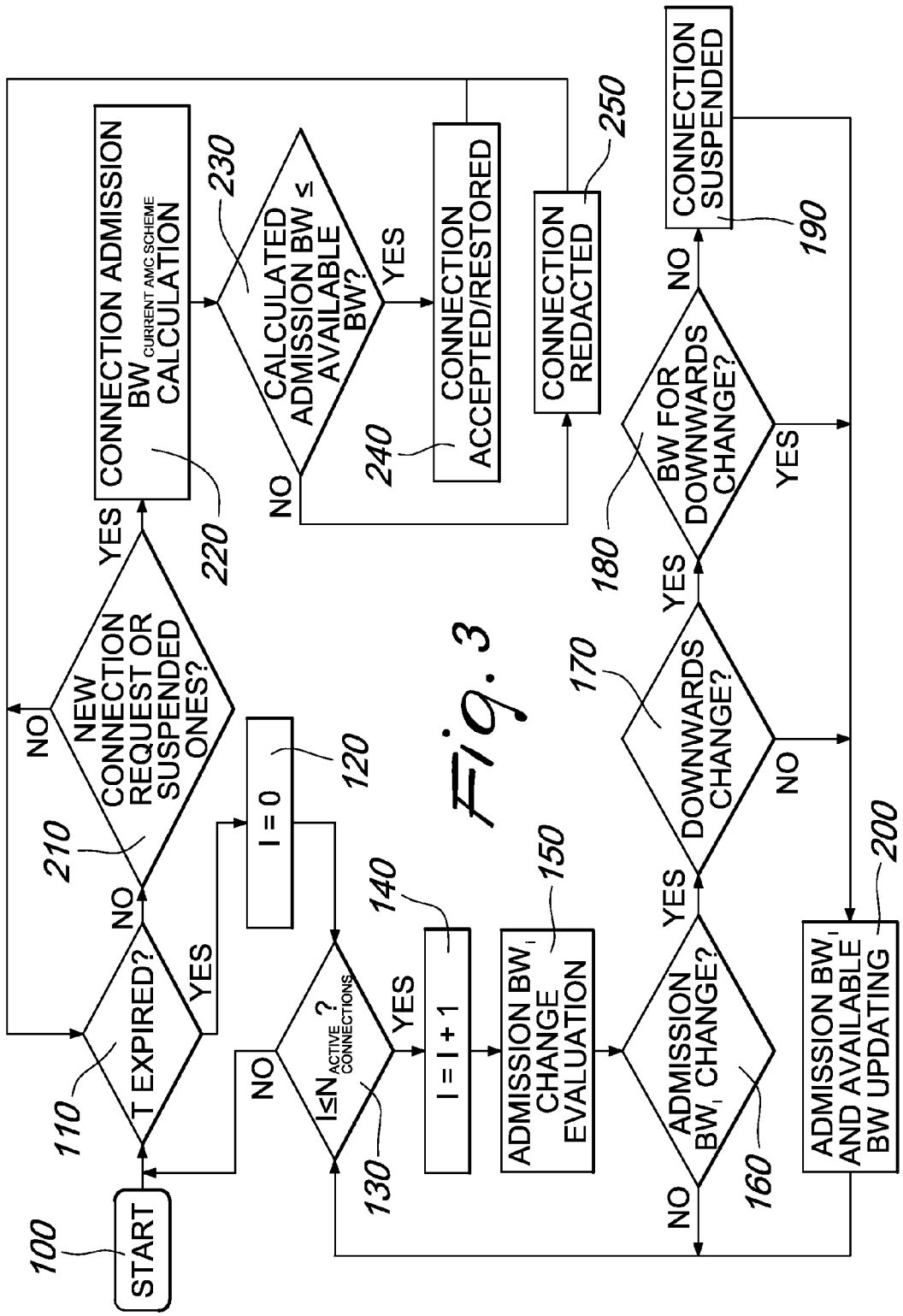
FIG. 3 is a flow diagram showing the functioning of a CAC module according to the present invention.

FIG. 3 is a flow diagram of a possible embodiment of the CAC module 11 according to the present invention.

The CAC method implemented in the module 11 starts at step 100, and has two main branches: ordinary activity, in which a check on new or suspended connections is performed, and periodical activity, in which a loop on all active connections is performed, in order to evaluate a possible change in admission bandwidth.

Specifically, at step 110 a check if a predetermined period T of time has expired is made. If T has not expired, computation continues at step 210, in which a check is made if there is a new connection or a suspended connection to be evaluated for admission in the system.

If there is not such a connection, control returns to step 110, otherwise at step 220 the CAC calculates the admission bandwidth for the current connection detected in step 210, that is the bandwidth needed to satisfy the QoS of the connection in the current AMC scheme.

Then, at step 230 the CAC checks if the admission-bandwidth is not greater than the available bandwidth: if this is the case, at step 240 the connection is accepted if it is a new one or restored if it is a suspended one, and the available bandwidth is updated; otherwise, at step 250 the connection is rejected. In both cases, control finally returns to step 110.

When the period T expires, the CAC checks all of the active connections, i.e. the connections already admitted by the system and not suspended, to see if the SNR values of the wireless links reach the connection SNR thresholds corresponding to an AMC scheme change.

More specifically, at step 120 a loop variable I is initialized and at step 130 the loop variable is checked for not exceeding the total number of active connections N: if this is the case, control returns to step 110, otherwise the loop variable is incremented at step 140 and at step 150 the current I-th active connection is evaluated to decide if it needs to or can change its admission bandwidth $BW_I$, i.e. its AMC scheme.

At step 160, if a change is not to be performed, control returns to step 130 for evaluating the next connection. Instead, if a change is to be made to the admission bandwidth $BW_I$, at step 170 the CAC evaluates if it is an upwards (higher rate AMC scheme) or a downwards (lower rate AMC scheme) change: if it is an upwards change, the I-th active connection will require less bandwidth, so at step 200 the CAC allocates the new bandwidth to the current I-th active connection, updates the available bandwidth and informs the MAC layer 12 of the AMC scheme change for the connection and then returns to step 130 for evaluating the next connection.

If at step 170 the evaluation results in a downwards change, at step 180 the CAC checks if there is enough available bandwidth for allowing the change. If the necessary bandwidth is not available at step 190, the CAC suspends such connection and starts increasing its service unavailability time, otherwise it adjusts the AMC scheme of such connection, and informs the MAC sub-layer of the AMC scheme changes.

After step 180 and/or 190, in both cases the CAC continues to step 200 to perform the same updating operations as in the upwards change case.

Figure 4:
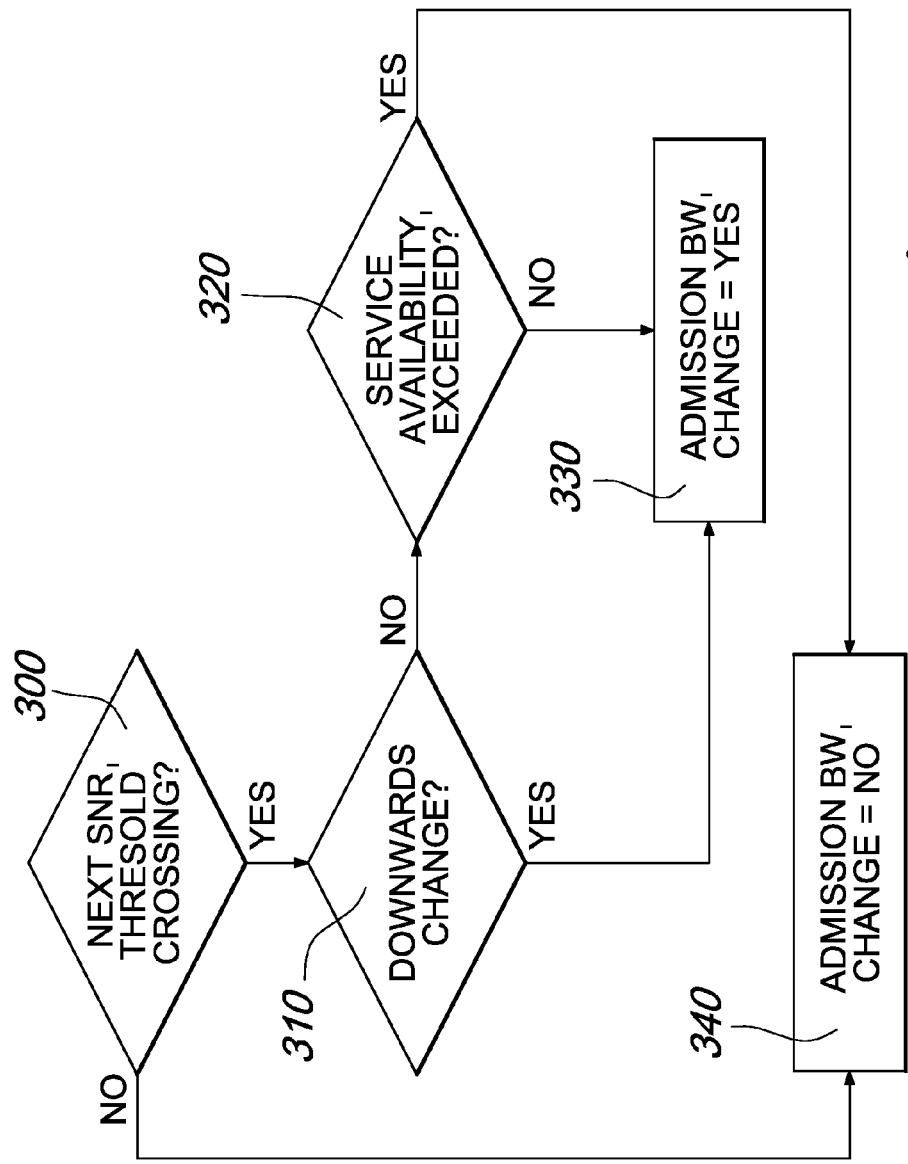
FIG. 4 is a flow diagram showing the functioning of the step of evaluation of the admission bandwidth of a connection of a CAC module according to the present invention.

FIG. 4 depicts in greater detail the procedure for evaluating the possibility of an admission-bandwidth change performed in step 150.

At step 300, the CAC evaluates if the SNR value of the current I-th active connection reaches the SNR threshold corresponding to an AMC scheme change. If the SNR threshold has not been reached, the method continues to step 340, in which the CAC decides that the admission-bandwidth could not be changed and the procedure stops, as indicated by option NO in block 160 of FIG. 3.

Otherwise, if at step 310 it is determined that the change needed is a downwards change, that is a change that requests more bandwidth, the method continues to step 330, in which the CAC decides that the admission-bandwidth could be changed.

If at step 310 the needed change is determined as an upwards change, i.e. a change that releases bandwidth, the method continues to step 320, in which the CAC determines if the service unavailability time of the current connection has reached its maximum value. In that case the method continues to step 340, i.e. the admission bandwidth of the current I-th active connection is not changed and thus is based on a more robust AMC scheme than the one allowed by the link conditions. Otherwise, if the service unavailability time of the current connection has not reached its maximum value, the method continues to step 330, where the CAC determines that the admission-bandwidth could be changed.

It is to be noted that the above procedure evaluates if a connection could or could not be changed regardless of the available bandwidth, that is taken into account in further steps.

It has been shown that the invention fully achieves the intended aim and objects, since it allows to dynamically adjust the admission-bandwidth over time, and at the same time to maintain desired QoS metrics and service availability levels. Consequently the invention optimizes capacity, utilization by exploiting the capabilities provided by and adaptive modulation and coding system.

Besides the invention provides a simple and easy way to implement solution that does not require complex calculations, yet providing good performance results.

The invention advantageously allows to be applied to both point to point and point to multi-point broadband fixed wireless access systems, WLAN systems and mobile networks.

Clearly, several modifications will be apparent to and can be readily made by the skilled in the art without departing from the scope of the present invention.

For example a guard threshold, higher than the changing one, may be introduced for each service availability level and for each AMC scheme, so that connections that experience a downwards AMC change are better protected, i.e. gain a longer time during which the admission blocking, tearing down of active connections, better weather conditions of other links can release bandwidth.

Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for controlling an admission of a connection in a wireless communication system between a base station and a subscriber unit, where a modulation and coding scheme of uplink and downlink communications can be varied over time, the method implemented by a Connection Admission Control module comprising steps of:
receiving a request for a connection;
if an available bandwidth corresponding to a current Adaptive Modulation and Coding (AMC) scheme is greater than an admission bandwidth of the connection, then admitting said connection and updating the available bandwidth;
wherein the method periodically performs the following steps:
evaluating if a current admission bandwidth can be changed for a plurality of active connections in view of a change in the current AMC scheme of such active connections;
if said current admission bandwidth can be changed and there is not enough available bandwidth to allow the change then:
stopping admission of new connections; and
performing at least one of following steps:
suspending at least one active connection of said plurality of active connections; and
changing the current AMC scheme of such at least one active connection; and
if said current admission bandwidth can be changed and there is enough available bandwidth to allow the change, then updating said current admission bandwidth for said plurality of active connections and updating the available bandwidth.

2. The method of claim 1, wherein said step of receiving a request for a connection comprises receiving a request for a suspended connection.

3. The method of claim 1, wherein said step of evaluating current admission bandwidth for a plurality of active connections comprises evaluating current admission bandwidth for all active connections.

4. The method of claim 1, wherein said step of evaluating if current admission bandwidth can be changed for a plurality of active connections comprises for each connection:
evaluating if a Signal-to-Noise Ratio (SNR) value of said connection reaches a threshold corresponding to an AMC scheme change;
if said SNR value of said connection does not reach the threshold corresponding to an AMC scheme change, deciding that the admission-bandwidth cannot be changed;
if said SNR value of said connection reaches the threshold corresponding to an AMC scheme change, evaluating if said AMC scheme change is a downwards change or an upwards change;
if said AMC scheme change is a downwards change, deciding that the admission-bandwidth could be changed;
if said AMC scheme change is an upwards change, evaluating if a service unavailability time of said connection has reached its maximum value;
if said service unavailability time has reached its maximum value, deciding that the admission bandwidth cannot be changed and if said service unavailability time has not reached its maximum value, deciding that the admission bandwidth can be changed.

5. The method of claim 1, wherein said step of suspending at least one active connection of said plurality of active connections comprises:
checking if there is at least one active connection whose maximum service unavailability time has not expired, and suspending it.

6. The method of claim 1, wherein said step of changing the AMC scheme of said at least one active connection comprises:
checking if there is at least one active connection whose admission bandwidth is lower than a bandwidth previously granted and changing the AMC scheme for said at least one connection.

7. A Connection Admission Control module for controlling an admission of a connection in a wireless communication system between a base station and a subscriber unit, where a modulation and coding scheme of uplink and downlink communications can be varied over time, the Connection Admission Control module comprising:
- means for receiving a request for a connection;
- means for admitting said connection and for updating an available bandwidth after checking that the available bandwidth corresponding to a current Adaptive Modulation and Coding (AMC) scheme is greater than an admission bandwidth of said connection;
- means for evaluating whether a current admission bandwidth can be changed for a plurality of active connections in view of a change in the current AMC scheme of such active connections;
- means for stopping the admission of new connections and at least one of means for suspending at least one active connection of said plurality of active connections and means for changing the current AMC scheme of such at least one active connection, after checking that said current admission bandwidth can be changed and there is not enough available bandwidth to allow the change; and
- means for updating said current admission bandwidth for said plurality of active connections and updating the available bandwidth, after checking that said current admission bandwidth can be changed and there is enough available bandwidth to allow the change.

8. The Connection Admission Control module of claim 7, wherein said means for receiving the request of a connection comprise means for receiving the request of a suspended connection.

9. The Connection Admission Control module of claim 7, wherein said means for evaluating whether the current admission bandwidth can be changed for a plurality of active connections comprise means for evaluating whether the current admission bandwidth can be changed for all active connections.

10. The Connection Admission Control module of claim 7, wherein said means for evaluating if current admission bandwidth can be changed for a plurality of active connections comprise for each connection:
- means for evaluating if a Signal-to-Noise Ratio (SNR) value of said connection reaches a threshold corresponding to an AMC scheme change;
- means for deciding that the admission bandwidth cannot be changed after checking that said SNR value of said connection does not reach the threshold corresponding to an AMC scheme change;
- means for evaluating if said AMC scheme change is a downwards change or an upwards change after checking that said SNR value of said connection reaches the threshold corresponding to an AMC scheme change;
- means for deciding that the admission bandwidth can be changed after checking that said AMC scheme change is a downwards change;
- means for evaluating if a service unavailability time of said connection has reached its maximum value after checking that said AMC scheme change is an upwards change;
- means for deciding that the admission bandwidth cannot be changed when said service unavailability time has reached its maximum value, and means for deciding that the admission bandwidth can be changed when said service unavailability time has not reached its maximum value.

11. The Connection Admission Control module of claim 7, wherein said means for suspending at least one active connection of said plurality of active connections comprise:
- means for checking if there is at least a connection whose maximum service unavailability time has not expired, and means for suspending at least one of said at least one connection.

12. The Connection Admission Control module of claim 7, wherein said means for changing the AMC scheme of said at least one active connection comprise:
- means for checking if there is at least one active connection whose admission bandwidth is lower than the bandwidth previously granted and means for changing the AMC scheme for said at least one connection.

13. A wireless communication station comprising a Media Access Control module and at least one physical device for handling wireless communication between the wireless communication station and a second wireless communication station, the wireless communication station further comprising a Connection Admission Control module, the Media Access Control module comprising means for interfacing with the physical layer and means for sending connection requests to the Connection Admission Control module, wherein the Connection Admission Control module comprises:
- means for receiving a request for a connection;
- means for admitting said connection and for updating an available bandwidth after checking that the available bandwidth corresponding to a current Adaptive Modulation and Coding (AMC) scheme is greater than an admission bandwidth of said connection;
- means for evaluating whether a current admission bandwidth can be changed for a plurality of active connections in view of a change in the current AMC scheme of such active connections;
- means for stopping the admission of new connections and at least one of means for suspending at least one active connection of said plurality of active connections and means for changing the current AMC scheme of such at least one active connection, after checking that said current admission bandwidth can be changed and there is not enough available bandwidth to allow the change; and
- means for updating said current admission bandwidth for said plurality of active connections and updating the available bandwidth, after checking that said current admission bandwidth can be changed and there is enough available bandwidth to allow the change.

14. The wireless communication station of claim 13, wherein said means for receiving the request of a connection comprise means for receiving the request of a suspended connection.

15. The wireless communication station of claim 13, wherein said means for evaluating whether the current admission bandwidth can be changed for a plurality of active connections comprise means for evaluating whether the current admission bandwidth can be changed for all active connections.

16. The wireless communication station of claim 13, wherein said means for evaluating if current admission bandwidth can be changed for a plurality of active connections comprise for each connection:
- means for evaluating if a Signal-to-Noise Ratio (SNR) value of said connection reaches a threshold corresponding to an AMC scheme change;
- means for deciding that the admission bandwidth cannot be changed, after checking that said SNR value of said connection does not reach the threshold corresponding to an AMC scheme change;

means for evaluating if said AMC scheme change is a downwards change or an upwards change, after checking that said SNR value of said connection reaches the threshold corresponding to an AMC scheme change;

means for deciding that the admission bandwidth can be changed, after checking that said AMC scheme change is a downwards change;

means for evaluating if a service unavailability time of said connection has reached its maximum value, after checking that said AMC scheme change is an upwards change;

means for deciding that the admission bandwidth cannot be changed if said service unavailability time has reached its maximum value, means for deciding that the admission bandwidth can be changed, after checking that said service unavailability time has not reached its maximum value.

17. The wireless communication station of claim 13, wherein said means for suspending at least one active connection of said plurality of active connections comprise:

means for checking if there is at least a connection whose maximum service unavailability time has not expired, and means for suspending at least one of said at least one connection.

18. The wireless communication station of claim 13, wherein said means for changing the AMC scheme of said at least one active connection comprise:

means for checking if there is at least one active connection whose admission bandwidth is lower than the bandwidth previously granted and means for changing the AMC scheme for said at least one connection.

19. A base station for controlling an admission of a connection in a wireless communication system between the base station and a subscriber unit, where a modulation and coding scheme of uplink and downlink communication can be varied over time, the base station comprising:

a processor; and a memory that stores processor-executable instructions where the processor interfaces with the memory and executes the processor-executable instructions to perform operations as follows:

receiving a request for a connection;

if an available bandwidth corresponding to a current Adaptive Modulation and Coding (AMC) scheme is greater than an admission bandwidth of the connection, then admitting said connection and updating the available bandwidth; periodically perform following operations:

evaluating if a current admission bandwidth can be changed for a plurality of active connections in view of a change in the current AMC scheme of such active connections;

if said current admission bandwidth can be changed and there is not enough available bandwidth to allow the change then:

stopping admission of new connections; and performing at least one of following operations:

suspending at least one active connection of said plurality of active connections; and changing the current AMC scheme of such at least one active connection; and if said current admission bandwidth can be changed and there is enough available bandwidth to allow the change, then updating said current admission bandwidth for said plurality of active connections and updating the available bandwidth.

20. A method for controlling an admission of a connection in a wireless communication system between a base station and a subscriber unit, where a modulation and coding scheme of uplink and downlink communication can be varied over time, the method implemented by the base station comprising steps of:

receiving a request for a connection;

if an available bandwidth corresponding to a current Adaptive Modulation and Coding (AMC) scheme is greater than an admission bandwidth of the connection, then admitting said connection and updating the available bandwidth; wherein the method periodically performs following steps:

evaluating if a current admission bandwidth can be changed for a plurality of active connections in view of a change in the current AMC scheme of such active connections;

if said current admission bandwidth can be changed and there is not enough available bandwidth to allow the change then:

stopping admission of new connections; and performing at least one of following steps:

suspending at least one active connection of said plurality of active connections; and changing the current AMC scheme of such at least one active connection; and if said current admission bandwidth can be changed and there is enough available bandwidth to allow the change, then updating said current admission bandwidth for said plurality of active connections and updating the available bandwidth.

21. A method for controlling admission of connections in a wireless communication system between a base station and multiple subscriber units, where a modulation and coding scheme of uplink and downlink communications can be varied over time, the method implemented by a base station comprising steps of:

checking if a predetermined period of time has expired;

if the predetermined period of time has not expired, then performing following steps:

checking if there is a new connection or a suspended connection to be evaluated for admission in the wireless communication system;

if the second checking step is no, then returning to the first checking step; and if the second checking step is yes, then performing following steps:

calculating an admission bandwidth for the new connection or the suspended connection, where the admission bandwidth is bandwidth needed to satisfy a Quality-of-Service (QoS) of the new connection or the suspended connection in a current Adaptive Modulation and Coding (AMC) scheme;

checking if the admission bandwidth is not greater than an available bandwidth, wherein if the third checking step is yes then accepting the new connection or restoring the suspended connection, and wherein if the third checking step is no then rejecting the new connection or the suspended rejection;

if the predetermined period of time has expired, then performing following steps:

initializing a loop variable I;

checking if the loop variable I does not exceed a total number of active connections in the wireless communication system, wherein if the fourth checking step is yes then returning to the first checking step, and wherein if the fourth checking step is no then performing following steps:

incrementing by one the loop variable I;

evaluating a current I-th active connection which corresponds to the incremented loop variable I;

determining if the current I-th active connection needs to or can change its AMC scheme, wherein if the determining step is no then returning to the fourth checking step, and wherein if the determining step is yes then performing following steps:

determining if the change to be made to the current I-th active connection is an upwards change or a downwards change, wherein if the upwards change is needed then allocating new bandwidth to the current I-th active connection and updating the available bandwidth and returning to the fourth checking step, wherein if the downwards change is needed then checking if the available bandwidth is enough for allowing the downwards change, wherein if the fifth checking step is no then suspending the current I-th active connection and increasing a service unavailability time for the current I-th active connection, wherein if the fifth checking step is yes then adjusting the current AMC scheme of the I-th active connection.

22. A base station for controlling an admission of a connection in a wireless communication system between the base station and a subscriber unit, where a modulation and coding scheme of uplink and downlink communication can be varied over time, the base station comprising:

a processor; and a memory that stores processor-executable instructions where the processor interfaces with the memory and executes the processor-executable instructions to perform operations as follows:

checking if a predetermined period of time has expired;

if the predetermined period of time has not expired, then performing following operations:

checking if there is a new connection or a suspended connection to be evaluated for admission in the wireless communication system;

if the second checking operation is no, then returning to the first checking operation; and if the second checking operation is yes, then performing following operations:

calculating an admission bandwidth for the new connection or the suspended connection, where the admission bandwidth is bandwidth needed to satisfy a Quality-of-Service (QoS) of the new connection or the suspended connection in a current Adaptive Modulation and Coding (AMC) scheme;

checking if the admission bandwidth is not greater than an available bandwidth, wherein if the third checking operation is yes then accepting the new connection or restoring the suspended connection, and wherein if the third checking operation is no then rejecting the new connection or the suspended rejection;

if the predetermined period of time has expired, then performing following operations:

initializing a loop variable I;

checking if the loop variable I does not exceed a total number of active connections in the wireless communication system, wherein if the fourth checking operation is yes then returning to the first checking operation, and wherein if the fourth checking operation is no then performing following operations:

incrementing by one the loop variable I;

evaluating a current I-th active connection which corresponds to the incremented loop variable I;

determining if the current I-th active connection needs to or can change its AMC scheme, wherein if the determining operation is no then returning to the fourth checking operation, and wherein if the determining operation is yes then performing following operations:

determining if the change to be made to the current I-th active connection is an upwards change or a downwards change, wherein if the upwards change is needed then allocating new bandwidth to the current I-th active connection and updating the available bandwidth and returning to the fourth checking operation, wherein if the downwards change is needed then checking if the available bandwidth is enough for allowing the downwards change, wherein if the fifth checking operation is no then suspending the current I-th active connection and increasing a service unavailability time for the current I-th active connection, wherein if the fifth checking operation is yes then adjusting the current AMC scheme of the I-th active connection.

* * * * *

UNITED STATES PATENT AND TRADEMARK OFFICE
CERTIFICATE OF CORRECTION

PATENT NO. : 8,503,296 B2  
APPLICATION NO. : 13/061352  
DATED : August 6, 2013  
INVENTOR(S) : Settembre et al.

Page 1 of 1

It is certified that error appears in the above-identified patent and that said Letters Patent is hereby corrected as shown below:

In the Drawings

In Fig. 3, Sheet 3 of 4, for Tag "250", in Line 2, delete "REDACTED" and insert -- REJECTED --, therefor.

In Fig. 4, Sheet 4 of 4, for Tag "300", in Line 2, delete "THRESOLD" and insert -- THRESHOLD --, therefor.

In the Specifications

In Column 3, Line 39, delete "drawbacks" and insert -- drawbacks. --, therefor.

In Column 5, Line 57, delete "CAC module 12" and insert -- CAC module 11 --, therefor.

In Column 6, Lines 44-45, delete "MAC layer 12" and insert -- MAC module 12 --, therefor.

In the Claims

In Column 11, Line 15, in Claim 16, delete "value," and insert -- value; and --, therefor.

Signed and Sealed this  
Twenty-second Day of April, 2014

Michelle K. Lee  
*Deputy Director of the United States Patent and Trademark Office*